United States Patent
Sabry et al.

(10) Patent No.: US 8,190,731 B2
(45) Date of Patent: May 29, 2012

(54) NETWORK STATISTICS PROCESSING DEVICE

(75) Inventors: Charlie Sabry, Ottawa (CA); Gordon Hanes, Ottawa (CA); Robert John Johnson, Ottawa (CA)

(73) Assignee: Alcatel Lucent, Paris (FR)

( * ) Notice: Subject to any disclaimer, the term of this patent is extended or adjusted under 35 U.S.C. 154(b) by 2743 days.

(21) Appl. No.: 10/866,812

(22) Filed: Jun. 15, 2004

(65) Prior Publication Data

US 2005/0276275 A1 Dec. 15, 2005

(51) Int. Cl.
*G06F 15/173* (2006.01)

(52) U.S. Cl. ........ 709/224; 709/223; 709/227; 370/235; 370/516; 370/250; 370/241

(58) Field of Classification Search .......... 709/223–224; 370/241, 252
See application file for complete search history.

(56) References Cited

U.S. PATENT DOCUMENTS

| | | | | |
|---|---|---|---|---|
| 4,817,080 A | * | 3/1989 | Soha | 370/252 |
| 5,805,602 A | * | 9/1998 | Cloutier et al. | 370/516 |
| 6,460,010 B1 | * | 10/2002 | Hanes et al. | 702/179 |
| 6,748,540 B1 | * | 6/2004 | Canestaro et al. | 726/26 |
| 2002/0141342 A1 | * | 10/2002 | Furman et al. | 370/235 |
| 2002/0183969 A1 | | 12/2002 | Hanes | |

* cited by examiner

*Primary Examiner* — Hua Fan
(74) *Attorney, Agent, or Firm* — Kramer & Amado P.C.

(57) ABSTRACT

A network statistics processing device comprises a port processing unit for determining an update from a forward statistic metric carried by an input PDU, an arbitration unit for placing the updates into a scheduled stream of updates, and a memory unit for storing statistic totals relating to the network operating parameters. The port processing unit also processes the statistic results retrieved from the memory into reverse statistic metrics that are inserted into an output PDU. A statistics monitoring and processing unit enables performance of high level statistical processing on selected updates and on the results. A method of generating and maintaining statistic totals on a plurality of network operating parameters is also described. This arrangement reduces backplane traffic, provides the statistical ports with intelligence and so as to accommodate plural transmission protocols, and provides greater visibility into transactions that can occur on a network to provide debugging, flow and/or load information.

20 Claims, 3 Drawing Sheets

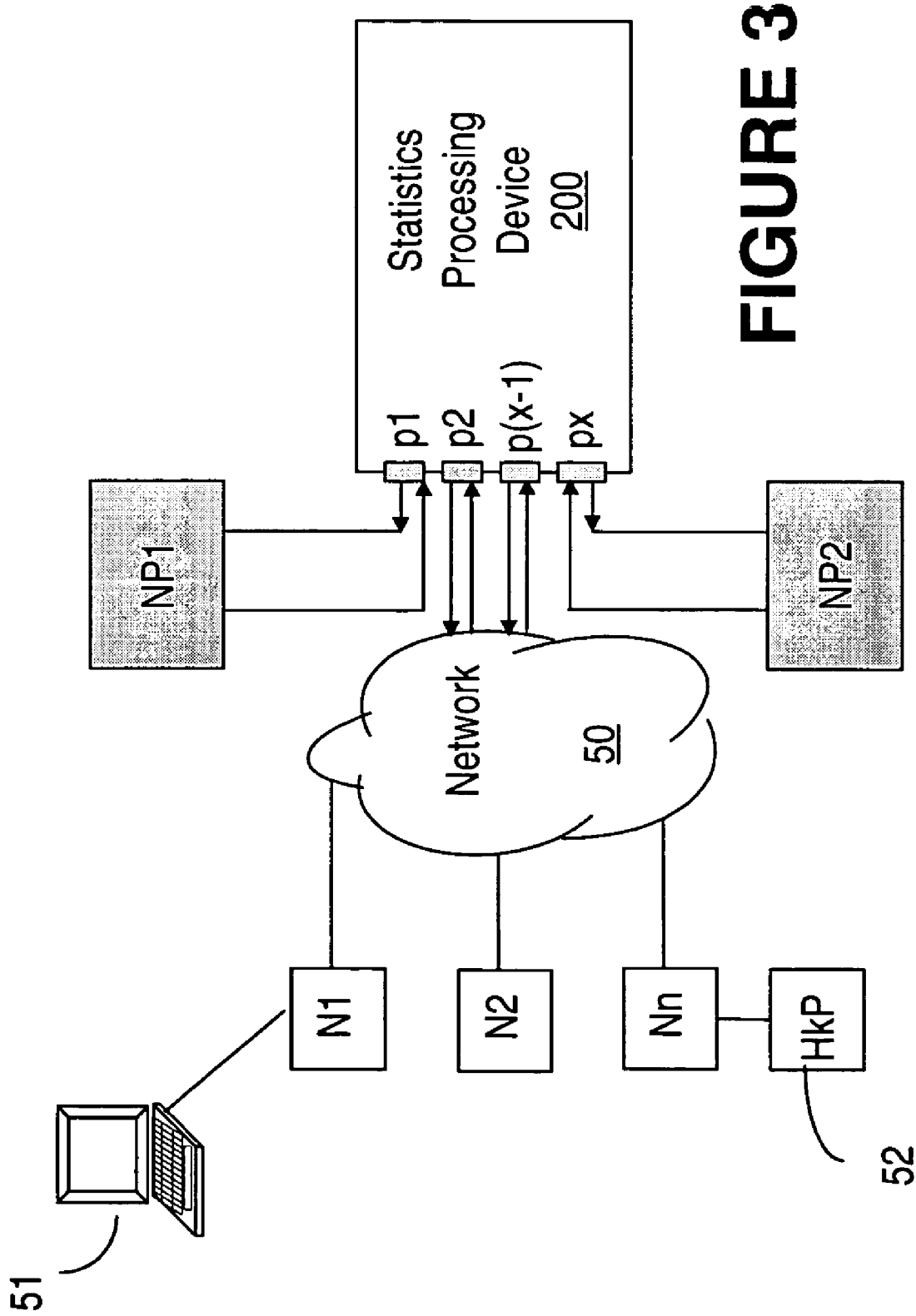

NETWORK STATISTICS PROCESSING DEVICE

FIELD OF THE INVENTION

The invention is directed to communication networks and in particular to improved statistics collection and processing in such networks.

BACKGROUND OF THE INVENTION

Modern communication networks are comprised of heterogeneous network devices, the physical hardware connections between these devices, and the software used to send, receive and switch/route data. Driven by the customer demand, the communication network experiences an unprecedented evolution, which encompasses at least three broad aspects. First and most importantly, the size of the communication networks grows as the number of customers grows and sub-networks of various technologies are interfaced to enable communication between customers located in far-apart geographical areas. A second aspect of network evolution is the development of new, more sophisticated services based on bandwidth-hungry and computationally intensive applications, like Voice-over-IP, video application, peer-to-peer applications, VPNs, etc. A third aspect of this evolution is the ever-changing network configuration, as new, better performing technologies and equipment become available to replace the existing equipment, or as the existing equipment is re-located.

In addition, in most cases the network traffic patterns changes radically from the design stage of the network to the deployment stage, so that the routing capacity of certain connections may become quickly outdated, resulting in inefficient utilization of the equipment. The traffic patterns within a communication network not only vary over long time periods (month and year) due to addition of new subscribers or/and services, but also over shorter periods (days) during seasonal events (e.g. shows, sport events), and/or during a 24 hours interval, (e.g. decreasing during night).

To enable handling of this rapid evolution, it is desirable to collect on-line data on network operation parameters, generate from these data statistics on events and conditions that span network elements and sub-networks, and to correlate these events and conditions to obtain a better view of the network operation as a whole. Statistics may be ultimately used, for example, to optimize the relative distribution of traffic loads between selected routes within the network, or to detect defective network devices or groups, or to allow adjustment of alarm limits, detect attacks on the network integrity, etc.

As the network evolves, the nodes increasingly need to calculate many different statistics on potentially thousands of traffic flows, so that statistics processing and maintenance can become a complicated task. Thus, statistics collection and processing involves monitoring various parameters of interest, performing calculations on the collected data to obtain a statistic, storing this statistic in a memory structure, where the data is organized in a meaningful way, such that it can be readily updated, retrieved and analyzed. Each time a particular statistic needs to be updated in the memory, the current stored value must be read, the modification to the value made, and the resulting value stored back into the memory. Statistics collection, processing and maintenance can consume significant processing capacity and system backplane bandwidth, both of which must be used judiciously in any system.

In the meantime, integrated circuit technology and semiconductor processing continue to advance, so that the integrated circuits have progressively become smaller and denser, while their processing and/or storage capacity increased importantly. Additional processing capacity becomes available with the implementation of complex hardware devices such as field programmable gate arrays (FPGA) for lower level data processing and general purpose processors (GPP) for higher layer processing. Network processors (NP) were developed lately; a NP is an application-specific instruction processor programmed for a specific network application (e.g. ATM cell processors, IP packet processors, etc.).

Still, if statistics processing is performed by a traffic NP, it may reduce the efficiency with which the processor performs the functionality it is designed for, namely carrying traffic across the network. In addition, in many cases there is little or no free card space around a traffic NP for the statistics processing circuitry, particularly for the memory circuitry necessary for maintaining the statistics.

Dedicated statistics processing device are now designed with a view to collect, process and store the statistical data from a number of sources, in order to ease the task of the respective traffic NPs. If a statistics processing device collects statistical data from off-board sources, this action uses backplane bandwidth that may have been otherwise used for executing the application itself. It is therefore advantageous to provide an on-board statistics processing device that uses data from on-board traffic NPs, with a view to eliminate statistics calculation backplane traffic.

For example, U.S. Pat. No. 6,460,101 entitled "Method and Apparatus for Statistical Compilation" (Hanes et al.), issued on Dec. 5, 2002 and assigned to Alcatel, Inc. and a division of this patent, namely U.S. patent application Ser. No. 10/201, 766 describe a statistical device that uses a memory comprising multiple memory banks for storing statistics. The statistics device "partitions" statistical data pertaining to a network parameter under consideration, and stores the part in a plurality of memory banks to improve performance by overcoming memory read/write contentions. In this manner, a statistic may be modified by adding/subtracting to the part of the statistic in a memory bank, thereby increasing the rate at which modifications can be made. When a statistic needs to be retrieved, each part is read from the respective bank, and the parts are summed to assembly the statistic. The subject matter of U.S. Pat. No. 6,460,101 and of U.S. patent application Ser. No. 10/201,766 are incorporated herein by reference.

However, it is still desirable to provide additional functionality to such a statistics processing device, for making it more suitable for rapid processing of heterogeneous statistics data, received in various formats from various statistics collecting points in a communication network.

SUMMARY OF THE INVENTION

It is an object of the invention to provide an improved network statistics processing device that alleviates totally or in part the drawbacks of the prior art devices.

It is another object of the invention to provide a network statistics processing device that allows on-board formatting of statistics data to suit the environment for transport or interpretation by another system, such as a network management system.

Accordingly, the invention provides a communication network with a network statistics processing device comprising: means for determining an update from a forward statistic metric carried by an input PDU, the update relating to a network operating parameter; an arbitration unit for placing the update into a scheduled stream of updates; and a memory unit for storing a statistic total relating to the network operating parameter and updating the statistic total with the update.

In addition, the invention provides a communication network with a method of generating and maintaining statistic totals on a plurality of network operating parameters, comprising the steps of: a) determining an update from a forward statistic metric carried by an input PDU, the update relating to a network operating parameter; b) storing a statistic total for the network operating parameter, and updating the statistic total using the update; and c) placing the update into a scheduled stream of statistic updates for speeding execution of step b).

Advantageously, the on-board statistics processing device of the invention enables reduced statistics calculation backplane traffic, since data collection and processing is performed on the same card. As well, the device of the invention uses inexpensive microprocessors to perform a massive amount of statistic calculations, resulting in a low-cost implementation, while providing greater visibility into transactions that can occur on a network or system to provide data debugging/flow/load information.

Still another advantage of the invention is that it allows provision of additional applications; for example it enables detection of unauthorized accesses, or detection of traffic loss from internal errors, etc.

BRIEF DESCRIPTION OF THE DRAWINGS

The foregoing and other objects, features and advantages of the invention will be apparent from the following more particular description of the preferred embodiments, as illustrated in the appended drawings, where:

FIG. 3 shows operation of the statistics processing device of the invention in the context of the network.

DETAILED DESCRIPTION

Figure 1:
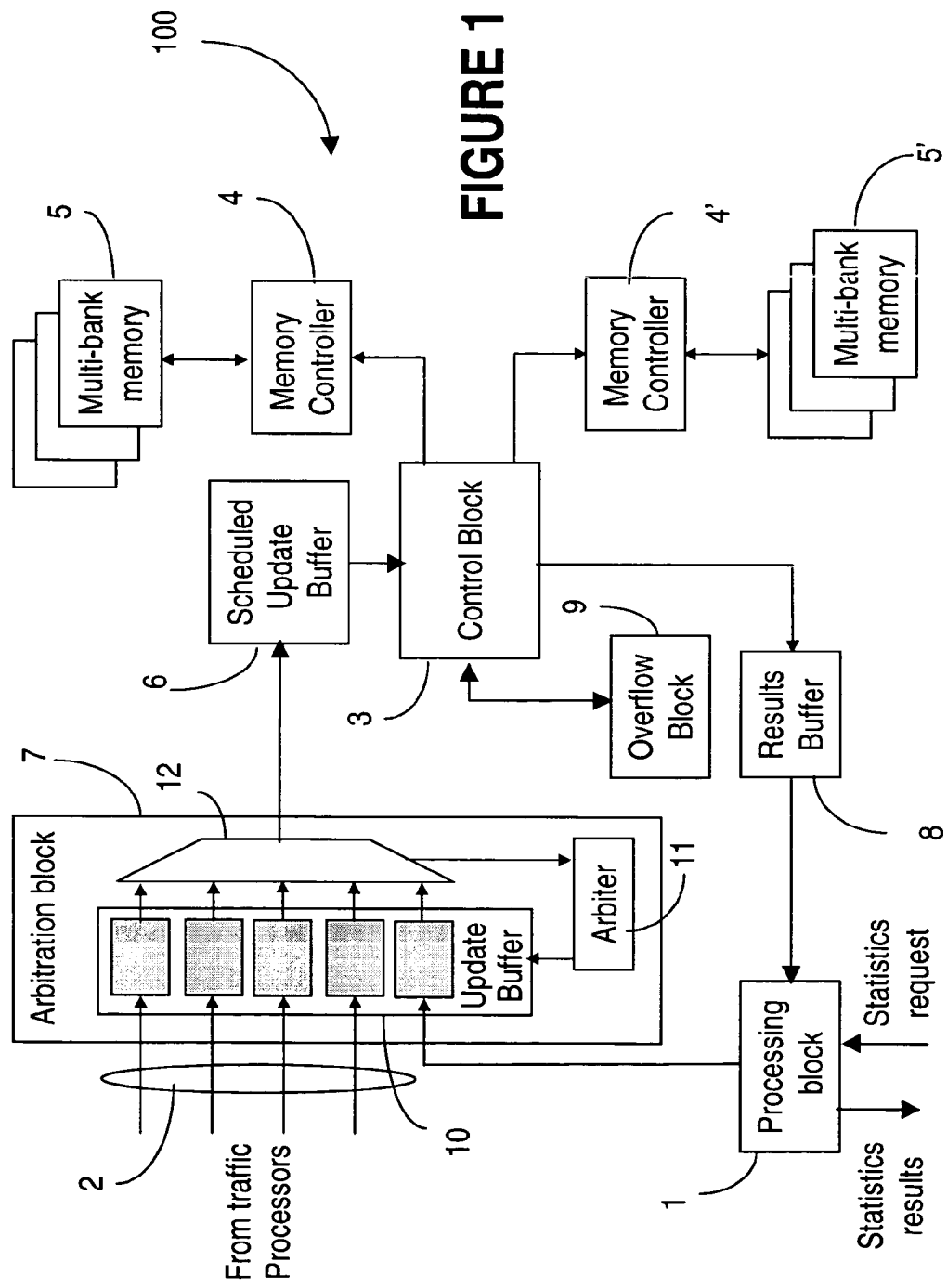
FIG. 1 is a block diagram of a statistical compilation circuit (Prior Art)

FIG. 1 is a block diagram of a statistical compilation circuit 100 as described in the above-identified U.S. Pat. No. 6,460,010; the ensuing description of this drawing is provided for better understanding the advantages of the solution proposed by the present invention. In the following, the term "forward" is used to define the direction for updating the statistics (a write operation), and the term "reverse" is used to define the direction for providing the statistical data to the requester (read direction). It is to be noted that these are relative terms and they should not be construed to limit the scope of the invention.

The statistics device 100 of FIG. 1 is intended to minimize the processing resources consumed through statistic update operations by the datapath (or traffic) processors, by processing statistical updates 2 received from a plurality of traffic processors (not shown). As such, the statistics device 100 can offload from the datapath processors all of the read, modification, and writing operations required to update statistics. Also, since each traffic processor issues a single command for the statistics device to adequately maintain various statistics for the network, the architecture of FIG. 1 results in further offload of some control functionality from the datapath processors.

Preferably, the format of each statistical update is standardized to include a statistic identifier and an update operand, representing the change in a particular statistic. For example, one statistical update may correspond to the billing statistic for a particular user of a certain network. In this case, one of the traffic processors would issue a statistical update that includes a statistic identifier that specifies that the billing statistic for that user is to be updated, and an update operand that specifies the change to that billing statistic. In this example, the change may be to increment the billing statistic by a certain amount.

Because a statistics device typically processes a large number of statistical updates, the memory used to store the statistics is preferably a multi-bank memory 5, 5'. The memory banks are controlled using a respective memory controller 4, 4', to allow parallel processing of the data. This architecture allows a number of update operations to be performed in quick succession, while ensuring that multiple updates to a single statistic do not interfere with each other. Utilizing a multi-bank memory allows multiple component portions (or parts) for each statistic to be maintained in different banks within the memory, resulting in efficient memory accesses, and much higher operating speeds.

In addition, each multi-bank memory 5, 5' can be used during different time intervals. Let's say that multi-bank memory 5 is used to process current statistic updates, while multi-bank memory 5' stores the results of a statistic update for a prior time interval. In other embodiments, the multiple multi-bank memories may be used to keep the statistics collected over different time periods; let's say that multi-bank memory 5 keeps statistics on an hourly basis, while multi-bank memory 5' stores the statistics for a 24-hour period; obviously other time slices may be appropriate for different applications.

A control block 3 performs a read operation for each scheduled update, for retrieving from one of the banks of memory 5, 5' a component value of one of the statistic component portions for a particular statistic. The control block 3 then combines the operand for the particular scheduled update with the component value that has been retrieved, to produce an updated component value. The control block 3 also performs a write operation to overwrite component values fetched by the corresponding read operation, by storing the updated component value produced through the combination operations. Still further, control block 3 receives and processes requests for statistic results from a processing block 1.

Additional efficiencies are achieved by sequencing multiple statistic updates such that down time associated with switching between reading and writing operations to the multi-bank memory 5, 5' is reduced. Thus, an arbitration block 7 at the input side of the statistics device, enables prioritization of statistic processing. The arbitration block includes an update buffer 10, an arbiter 11 and a selection block 12. The update buffer 10 may comprise individual stream buffers as shown, and may also include a statistics request buffer for the requests issued by processing block 1 so that the statistic requests are also serviced in accordance with the same arbitration scheme. The arbiter 11 controls the sequential execution of the received statistical updates based on a queueing technique or some other prioritization scheme, and prioritizes the data in the flows via selection block 12, to produce a scheduled update stream. The scheduled update stream may be buffered by at buffer 6 that is coupled to the selection block 12, with a view to improve the overall throughput of the statistics device.

Processing block 1 provides a user with the statistics of interest on request from an external processor over a corresponding interface. The requester aggregates the counts from the multiple memory banks 5 through the control block 3 and out the processing block 1. In order to enable the processing block 1 to operate more efficiently, a results buffer 8 and an overflow block 9 may be included in the statistics device.

Figure 2:
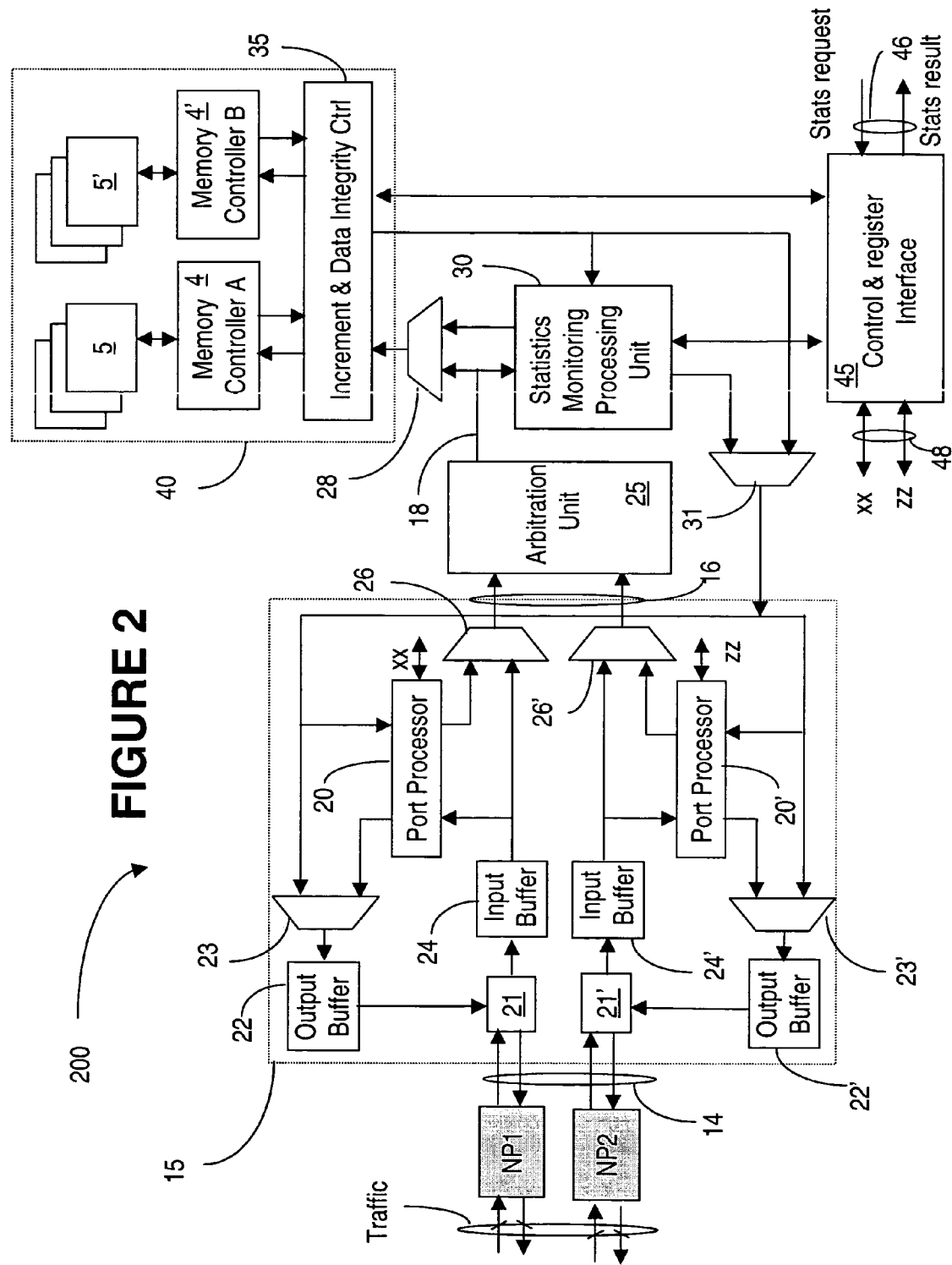
FIG. 2 shows a block diagram of a network statistics processing device according to an embodiment of the invention.

FIG. 2 illustrates an embodiment of a statistics processing device 200 with enhanced functionality according to the invention. In general terms, statistics processing device 200 includes a port processing unit 15, an arbitration unit 25, a statistics monitoring and processing unit 30, and a memory unit 40, whose operation is described next. In the following, the data format received by port processing unit 15 over interfaces 14 is called generically a protocol data unit (PDU), which term covers any data formats. In the embodiment of FIG. 2, an incoming (input) PDU carries incoming metrics that are processed by device 200 for determining a specific update for a specific statistical data that should be refreshed at a certain time. An outgoing PDU on interface 14 carries outgoing metrics (updated statistic result) for one or more surveyed parameters. As well, term "statistical result" is used for the data stored in the memory unit, representing the current statistic count (total) that is adjusted at specified intervals of time with the increments received from the statistics monitoring and processing unit 30.

One of the main differences with respect to the prior art statistics processing device 100 described above is that the statistics ports (hereinafter called ports for brevity) of device 200 are provided with intelligence. Namely, device 200 performs processing of statistics metrics received from a plurality of heterogeneous statistics sources and has the ability to transmit statistic results on one or more heterogeneous statistics requestors.

The embodiment of FIG. 2 illustrates a port processing unit 15 with two ports, denoted with 21 and respectively 21'; it is to be noted that the invention is not restricted to this configuration, and that device 200 may have a different number of ports. Each port 21, 21' is equipped with a respective port processor 20, 20'. Each port 21, 21' transmits a flow of input (incoming) PDU's to the respective port processor or directly to the arbitration unit 25, and receives a flow of output (outgoing) PDU's from the port processor or directly from either the statistics monitor processing unit 30 or the increment and data integrity controller 35. As indicated above, and discussed in further detail in connection with operation of the port processors, each port may support a different PDU format. Thus, the NP1 and NP2 may be devices of the same type (e.g. FPGA's, or NP's or GPP's) or may be of different types (e.g. NP1 may be a FPGA and NP2 may be a NP or a GPP, etc).

Provision of port processing unit 15 is useful when dealing with limited bandwidth constraints on a port, so some form of data compression or encoding may be used, to pack updates in an input metrics carried by the incoming PDU's. This feature is also useful when the source of the updates (e.g. the traffic processor) is not sophisticated enough to identify a particular group of counters when the statistical increment is generated. It is therefore an important advantage to have an input PDU carry a certain metric rather than receiving updates on a bus as in the prior art solution shown in FIG. 1. This feature importantly reduces the backplane bandwidth, since the metrics occupy less bandwidth than the data itself.

Along the same lines, an input PDU may carry more than one metric, each metric being for a different statistic or for the same statistic but obtained at chronological intervals of time, the port processors being configured to process each metric according to a respective processing plan. A similar PDU configuration is used for the output PDU's, that may carry one or more metrics referring to statistic results.

Provision of port processing unit 15 not only enables bidirectionality, but it also enables processing of various types of input and output PDU's. Thus, each port (interface 14) may be configured to operate on a specific PDU type and interface, according to the network processor they serve. Port processors 20 and 20' are also capable of performing simple statistical operations on the input metrics received from the associated port and on a statistic result received from statistics and monitoring unit 30. Also, processors 20, 20' add the ability to alter the format and interpretation of a statistical increment before it is combined with other counts in the memory.

The ports are preferably provided with input buffers 24, 24' and output buffers 22, 22' for optimizing operation of the port processors. Input buffers 24, 24' temporarily store the input PDU's before processing by the port processors 20, 20', and output buffers 22, 22' temporarily store the output PDU's before providing them to the requester. The size of the buffers is selected to temporarily store a predetermined number of PDU's, and they are designed for the respective interface/PDU type.

Since device 200 accepts various data protocols, it is possible that the incoming PDU's will not need interpretation by port processors 20, 20'. When an input PDU is identified as a format and protocol that can be transmitted directly to the arbiter 25, a forward multiplexer 26, 26' allows these updates to bypass the respective port processor 20, 20', in turn allowing the port processor to work on other tasks. Similarly, reverse multiplexers 23 and 23' allow the statistical results with a format and protocol that does need interpretation by port processors, to be transmitted directly to the traffic network processors NP1 and NP2. For convenience, the data stream on interfaces 16 at the output of the port processing unit 15 (i.e. the statistic updates pre-processed or not by the port processors) is referred to as "statistic updates".

Arbitration unit 25 controls the sequential execution of the pre-processed statistical updates and prioritizes the data to provide a scheduled update stream shown at 18, for reducing the down time associated with switching between reading and writing operations to the memory unit 40. The scheduled update stream may be buffered (not shown explicitly) to improve the overall throughput of the statistics processing device 200. The arbitration process may use a round-robin scheme, a weighted fair queuing technique, or some other prioritization scheme. The weighted fair queuing technique may schedule the updates based on the priority level of each statistical update stream, the loading level of each statistical update stream buffer, or some combination of these two factors. The arbitration unit 25 may alternatively include a receipt sequence priority encoder such that statistic updates are performed in temporal order based on order of receipt, as described in the above referenced patent U.S. Pat. No. 6,460,010 (Hanes et al.).

The statistics monitoring and processing unit 30 enables more sophisticated monitoring and control of read and write operations involving memory unit 40. In the forward direction, monitoring and processing unit 30 provides complex formatting, grouping, reading, updating and statistical functions on the increments received from the arbitration unit 25 in the scheduled update stream 18. In the reverse direction, upon retrieval of a certain statistic result, unit 30 compresses, encodes, or even duplicates the statistic results to be transmitted out over any of the ports 21, 21', or over a local processor interface 45. Some statistic results may be flagged as query type only in that they are never transmitted unless specifically requested, and are filtered and discarded without being transmitted otherwise.

The statistics monitoring and processing unit 30 allows for generating real-time events based on sudden or transient statistic conditions. This enables complex and difficult applications to have very fast low level access to statistical behavior, and generate action based on the statistics. Unit 30 may also monitor the pattern of statistic increments and, based on combinations of statistical events, generate statistical events to be stored in the statistic memory. These statistical events could show short, mid or long term occurrence of certain conditions in a network that would otherwise be impossible to detect.

In addition, the monitoring and processing unit 30 can provide physical and application security related functions, based on user-configurable thresholds. For example, an attempt for unauthorized use of the network may be detected if the processing of the statistics received from e.g. on port 21 indicates a number of login attempts that is over a threshold. In this case, the unit 30 will issue an alarm that specifies the port, the source of the statistics and the type of violation. The functionality of the statistics monitoring and processing unit 30 may be performed using a general purpose processor (GPP).

Memory block 40 is organized in memory banks 5, 5' for allowing multiple memory operations to take place concurrently. Each memory banks 5, 5' is controlled using a respective memory controller 4, 4'; the memory controllers are operated by an increment and data integrity controller 35 that receives the statistics increments from unit 25.

The increment and data integrity controller 35 is used to manage the processed statistical increments in the attached memory devices and monitor data protection schemes. When statistics are incremented, the controller retrieves the current statistic value, combines it appropriately with the statistical increment, and stores the new value back in memory, generating any new protection data required. When statistic totals (results) are requested, the controller retrieves the values from memory and transmits them to the appropriate target, whether it is unit 30 for further processing, the control and register interface 45 for transmission over a local processor port 46, or directly to the port processor 20, 20' for transmission as a PDU.

The statistics processing device 200 of FIG. 2 has the ability to perform statistics collection using different intervals of times for different metrics sources and different type of statistics, as needed. For example, some data may be collected every second, others, every 15 minutes and every minute. Controller 35 administers the memory bank according to this information. More precisely, it finds a memory bank that is available for storing part of a processed statistical increment and keeps track of where the parts of the same statistics are stored for later re-construction. It also distributes the parts among the memory banks according to the statistics collection frequency (timing). This flexibility is of a great advantage to a network provider since it is not limited to one fixed interval as before.

The statistics processing device 200 of the invention may also comprise a control and register interface 45, used to setup and monitor the general operation of the statistics processor 30. Interface 45 may be used to translate commands from an external housekeeping processor interface (not shown) to an internal format. It houses registers that contain the bits that configure or enable the operation of the components (for example the reset bit that either resets the statistical device or enables it to operate). Additionally, statistic results can be transmitted out the processor interface block 45, over port 46 and it also provides one path (xx, zz) for the port processors 20, 20' and processing unit programs to be loaded into respective memory stores.

Port processors 20, 20' and the processing unit 30 can be used for additional functions such as statistic identifier redirection and/or duplication. Also, all processors are positioned such that the memory and data path elements can be tested at the application layer to verify physical integrity. Data integrity becomes more critical when statistics are used to calculate billing records.

The statistics processing device 200 of the invention may also be implemented on an ASIC or a FPGA, in the latter case the port processors may provide more basic functionality for cost-effectiveness.

FIG. 3 illustrates operation of the statistics processing device 200 of the invention in the context of a communication network 50. As shown, the port processors 20; 20' and statistics monitoring and processing unit 30 may be configured over network 50 from a configuration station 51, connected to a network node N1 using for example over a service channel (OAM). Device 200 may also transmit over network 50 some relevant statistics or alarms/warnings to a housekeeping process 52 at a node Nn.

We claim:

1. A network statistics processing device for a communication network, comprising:
a port processing unit that receives statistical metrics carried by input Protocol Data Units (PDUs) and transmits output PDUs that carry results, the port processing unit comprising:
a plurality of ports that receive the input PDUs and transmit the output PDUs, wherein each port of the plurality of ports supports a different PDU format,
an input buffer that temporarily stores said input PDUs,
a plurality of port processors, each port processor of the plurality of port processors connected to a respective port of the plurality of ports, wherein each port processor is configured to convert said input PDUs into processed PDUs and to convert statistical results into processed results,
a forward multiplexer that selectively transmits said input PDUs or said processed PDUs as an update,
a reverse multiplexer that selectively transmits said statistical results or said processed results as said output PDUs, and
an output buffer that temporarily stores said output PDUs before sending said output PDUs to a respective port of the plurality of ports;
an arbitration unit that receives said transmitted update from said forward multiplexer and transmits a stream of updates;
a memory unit that stores said statistical results; and
a statistical monitoring and processing unit that receives said stream of updates from said arbitration unit, receives said stored statistical results from said memory unit, and transmits said received statistical results to said port processing unit.

2. The device of claim 1, wherein said statistical monitoring and processing unit performs high level statistical processing on selected updates in said received stream of updates to obtain an increment referring to a specified network operating parameter and provides to said memory unit at least one of said received stream of updates and said obtained increment.

3. The device of claim 2, wherein said port processing unit processes said statistical results into reverse statistical metrics to be transported by said output PDUs.

4. The device of claim 3, wherein said statistical monitoring and processing unit is a General Purpose Processor (GPP).

5. The device of claim 1, further comprising:
an interface between said memory unit and a local statistics consumer for transmitting a statistical request for a certain statistical total to said memory unit, and transmitting said certain statistical total to said local statistics consumer from said memory unit.

6. The device of claim 1, wherein said memory unit comprises:
at least two memory banks, each for storing a part of a statistical total;
at least two memory controllers, each for controlling access to a respective memory bank for enabling parallel access to said stored part of said statistical total; and
an increment and data integrity controller that combines said stored part of said statistical total with said update to obtain a new statistical total and stores said new statistical total in said at least two memory banks.

7. The device of claim 2, wherein said memory unit comprises:
at least two memory banks, each for storing a part of said statistical total;
at least two memory controllers, each for controlling access to a respective memory bank for enabling parallel access to said stored part of said statistical total; and
an increment and data integrity controller that combines said stored part of said statistical total with said increment to obtain a new statistical total and stores said new statistical total in said at least two memory banks.

8. The device of claim 6, wherein said memory unit further comprises:
a receiver that receives a statistical request from a consumer, retrieves said statistical total from said at least two memory banks, and transmits said retrieved statistical total to said consumer.

9. The device of claim 8, wherein said consumer is one of a local consumer that receives said statistical total over a local interface and a remote consumer that receives said output PDUs transmitted by said respective port.

10. For a communication network, a method of generating and maintaining statistical totals on a plurality of network operating parameters, comprising:
determining an update from forward statistical metrics carried by input Protocol Data Units (PDUs), said update relating to a network operating parameter, wherein the determining step further comprises:
unpacking said forward statistical metrics from said input PDUs,
when said unpacked metrics do not require interpretation, transmitting said unpacked metrics directly as said update for scheduling, and
when said unpacked metrics require interpretation, processing said unpacked metrics into said update and transmitting said update;
storing a statistical total for said network operating parameter;
updating said stored statistical total using said transmitted update;
placing said transmitted update into a stream of statistical updates;
performing high level statistical processing on selected updates in said stream of statistical updates to obtain increments for said network operating parameter;
performing high level statistical processing on said updated statistical total to produce statistical results; and
processing said produced statistical results into reverse statistical metrics to be transported by output PDUs.

11. The method of claim 10, further comprising:
retrieving a certain statistical total in response to a request for the certain statistical total received from a consumer; and
providing said retrieved statistical total to said consumer over a control and register interface.

12. The method of claim 10, further comprising:
retrieving a certain statistical total in response to a request from a consumer;
performing high level statistical processing on said retrieved statistical total to obtain a statistical result; and
providing said obtained statistical result to said consumer over a control and register interface.

13. The method of claim 10, wherein the storing step comprises:
reading said statistical total from a multi-bank memory;
incrementing said read statistical total with said update to obtain an updated statistical total; and
writing said updated statistical total into said multi-bank memory.

14. The method of claim 10, wherein the update placing step comprises:
using one of a round-robin scheme, a weighted fair queuing scheme and a temporal order scheme based on an order of receipt of said selected updates.

15. The method of claim 10, wherein said high level statistical processing comprises one or more of complex formatting, grouping, reading, updating and statistical functions on said increments.

16. The method of claim 10, wherein said high level statistical processing comprises one or more of compressing, encoding and duplication of said statistical total into said statistical results.

17. The method of claim 10, wherein said high level statistical processing comprises:
flagging said statistical result; and
accordingly deciding whether to transmit said flagged statistical result to a consumer.

18. The method of claim 10, wherein said high level statistical processing comprises:
generating real-time events based on transient statistical conditions for enabling a consumer to have fast low level access to statistical behavior of said network operating parameter.

19. The method of claim 10, wherein said high level statistical processing comprises:
monitoring a pattern of said increments;
generating statistical events based on combinations of said increments;
storing said generated statistical events; and
analyzing said stored statistical events for detecting short, mid, or long term occurrence of a certain condition in said communication network.

20. The method of claim 10, wherein said high level statistical processing comprises:
counting a number of failed login requests to access said communication network from a certain address; and
declaring an unauthorized attempt to access said communication network based on a threshold set for a number of successive failed login requests.

* * * * *